United States Patent Office 3,551,501
Patented Dec. 29, 1970

3,551,501
SEPARATION AND PURIFICATION OF
4,4'-DIHYDROXY DIPHENYL SULFONE
John R. Clark, Nutley, N.J., assignor to Witco Chemical Company, Inc., New York, N.Y., a corporation of Delaware
No Drawing. Filed Oct. 19, 1967, Ser. No. 676,604
Int. Cl. C07c 147/10
U.S. Cl. 260—607
11 Claims

ABSTRACT OF THE DISCLOSURE 4,4'-dihydroxy diphenyl sulfone is separated from crude commercial grade 4,4'-dihydroxy diphenyl sulfone containing 2,4'-dihydroxy diphenyl sulfone as the principal impurity by extraction with an ester solvent having the general formula $R(COOR')_n$ where R may be hydrogen when n is 1; and R and R' may be unsubstituted or substituted lower alkyl, alkylene, alkenyl or alkoxy radicals containing from 1 to 10 carbon atoms, or phenyl radicals, when n is 1 or 2; which selectively dissolves the 2,4'-isomer. The 4,4'-isomer may be further refined to 99% pure, white crystals by treatment in hot aqueous alkaline solution with decolorinzing adsorbent.

Field of the invention

This invention relates to the separation and purification of 4,4'-dihydroxy diphenyl sulfone from mixtures comprising the 4,4'- and 2,4-isomers of dihydroxy diphenyl sulfone.

Description of the prior art

Commercial grades of 4,4'-dihydroxy diphenyl sulfone as produced by available methods, such as the sulfonation of phenol, are sold as a mixture of the 4,4'- and 2,4'-isomers. This product is generally a dark colored solid and may contain about 10–30% 2,4'-isomer, as well as trace amounts of other isomers, phenolic compounds and tars. Presence of these impurities, even in relatively small amounts, severely limits the field of uses for which 4,4'-dihydroxy diphenyl sulfone is applicable.

Various techniques have been developed for the separation of these isomers and are disclosed, for example, in U.S. Pats. 2,392,137; 2,833,828; 3,065,274.

The known methods of isolating and purifying 4,4'-dihydroxy diphenyl sulfone from these mixtures present certain problems, both from a technical and economical standpoint. Solvents which are hazardous and which present equipment problems when handling create obvious disadvantages. Also, known techniques generally do not produce a pure, white product of good color stability. This is believed due to the failure of the solvents effectively to extract trace quantities of phenolic compounds and tars which have a deleterious effect upon color. It is of great importance that a solvent extraction technique be inexpensive, technically simple, and at the same time produce stable, white crystals of 4,4'-dihydroxy diphenyl sulfone of very high purity.

SUMMARY

In accordance with this invention it has been discovered that 4,4'-dihydroxy diphenyl sulfone is separated effectively and in a high state of purity from mixture comprising the 4,4'-dihydroxy diphenyl sulfone in admixture with 2,4'-dihydroxy diphenyl sulfone by contacting the mixture with an ester extraction solvent resulting in selective solution of the 2,4'-dihydroxy diphenyl sulfone and separating the solution comprising dissolved 2,4'-dihydroxy diphenyl sulfone and solvent from the undissolved 4,4'-dihydroxy diphenyl sulfone. The ester solvents which are employed in accordance with the present invention are mono- and/or di-carboxylic acid esters of alcohols in which said acids and said alcohols each contain from 1 to 10 carbon atoms. Most of said ester solvents can be represented by the general formula $R(COOR')_n$ where R may be hydrogen, where n is 1; and R and R' may be unsubstituted or substituted alkyl, alkylene, alkenyl or alkoxy radicals containing from 1 to 10 carbon atoms, or phenyl radicals, when n is 1 or 2. Especially preferred are the normally liquid acetate esters wherein the carbon atom range in R' is 1 to 10.

DESCRIPTION OF THE PREFERRED EMBODIMENTS

In carrying out the process of the present invention, the mixed 4,4'- and 2,4'-isomers are brought into contact with the ester extraction solvent under conditions of temperature enabling selective solution of the 2,4'-isomer by the solvent from the mixture in suitable commercial equipment.

Most of the ester extraction solvents suitable for use in carrying out the process of the present invention, as indicated above, can be represented by the formula:

$$R(COOR')_n$$

where R may be hydrogen when n is 1; and where R and R' may be unsubstituted or substituted alkyl, alkylene, alkenyl or alkoxy radicals containing from 1 to 10 carbon atoms, or phenyl radicals, when n is 1 or 2. This formula embraces single esters and mixed esters.

Illustrative examples of esters, falling with the aforegoing formula and, therefore, useful in the practice of the process of the present invention include the low molecular weight esters of aliphatic acids such as methyl formate, ethyl formate, ethyl acetate, 2-ethylhexyl acetate, methyl acetate, ethyl acetate, propyl and isopropyl acetates, isobutyl acetate, methylamyl acetate, octyl acetate, methyl and ethyl propionate, methyl butyrate, ethyl butyrate, ethyl isobutyrate, isobutyl isobutyrate, and ethyl isovalerate. Especially suitable and preferred are the liquid acetate esters of $C_2$ to $C_6$ aliphatic monohydric alcohols such as isopropyl acetate and methylamyl acetate. Other examples of esters which can be utilized are esters of aromatic carboxylic acids such as methyl benzoate, butyl benzoate, benzyl benzoate, methyl and ethyl cinnamate and the higher homologs of these compounds; esters of polyhydric alcohols such as ethylene glycol diacetate, propylene glycol diacetate, and similar compounds; esters of di-carboxylic acids, both aliphatic and aromatic, such as dimethyl carbonate, dimethyl malonate, diethyl malonate, diethyl phthalate, dimethyl phthalate and similar compounds and their homologs; and mono- and di-esters containing other functional groups such as ethyl acetoacetate, diethyl maleate, butoxyethyl acetate. The esters, in general, may contain any functional group which does not react with the isomeric dihydroxy diphenyl sulfones. Similarly, the substituents in the alkyl, alkylene, alkenyl or alkoxy radicals in the foregoing formula can be any group or radical which does not react with the isomeric dihydroxy diphenyl sulfones, and will generally be of hydrocarbon character, illustrative examples of such substituents being lower alkyl, phenyl, aralkyl such as benzyl, alkylene-oxy lower alkyl such as $C_2H_4$—OR'' where R'' is lower alkyl, and carbonyl-substituted lower alkyl such as $CH_3$—CO—$CH_2$— and  $CH_3$—CO—$CH_2$—$CH_2$—. Those esters which are generally liquids at room temperature and which can be filtered using conventional equipment are especially preferred.

The quantity of ester solvent used may vary substantially with the different esters and will, of course, depend upon the composition of the isomer mixture with respect to the proportions of the 2,4'-isomer present. In carrying out the process of the present invention to effect the separation of 4,4'-dihydroxy diphenyl sulfone from a mixture containing about 10–30% 2,4'-isomer, sufficient ester extraction solvent is used to completely or substantially completely dissolve all of the 2,4'-isomer and it is generally preferred to use about 1 ml. of solvent for each gram of crude sulfone mixture.

Separation of the isomeric sulfones in accordance with the present invention may be carried out by combining the solvent and isomeric mixture in a suitable vessel. The mixture is stirred while the temperature is raised preferably to the reflux temperature of the solvent. Although separation of the isomers may be effected to a certain extent at temperatures as low as about room temperature, it is generally preferred to employ temperatures of at least about 40° C., and, better still, at the boiling temperatures of the ester solvent. After maintaining the mixture under reflux conditions, with agitation for a short time, generally less than one hour, the mixture is cooled to room temperature and filtered. Further washing of the filter cake with additional ester extraction solvent is preferred. Conventional techniques may be used to dry the 4,4'-dihydroxy diphenyl sulfones thusly recovered. If desired, the extraction can be carried out at pressures in excess of or below atmospheric pressure. Equipment and condition modifications for separation of the mixed isomers with the aid of the ester extraction solvents of the present invention are readily apparent to those skilled in the art.

Treatment with ester extraction solvents in accordance with the present invention provides a very thorough separation of the 4,4'- and 2,4'-isomers, and the high purity of the 4,4'-dihydroxy diphenyl sulfone isomer thus obtained renders it particularly suitable for many applications, as for instance, the production of resins and plastics. The treatment provides a 4,4'-dihydroxy diphenyl sulfone product having a light tan color and a melting point range of about 244° to 247° C. and which is substantially free, about 2% or less, of 2,4'-isomeric impurities, as compared to a commercial grade 4,4'-dihydroxy diphenyl sulfone produced by sulfonation of phenol that is quite dark in color and has a melting point range of 212°–240°.

It may be preferred, however, for certain applications, to have available a pure white crystalline form of the 4,4'-dihydroxy diphenyl sulfone. This may be achieved by treating the 4,4'-isomer product, made in accordance with the present invention, to produce a white crystalline product which will not discolor after extended periods of storage, by dissolving the solvent extracted 4,4'-dihydroxy diphenyl sulfone in a hot aqueous alkaline solution containing a small proportion of decolorizing carbon or charcoal, agitating the mixture while refluxing for about an hour, filtering the hot mixture, neutralizing the solution with strong acid and washing with water to remove excess acid from the crystalline material formed on cooling, and then drying.

Any strong base, for instance, sodium hydroxide, potassium hydroxide, sodium carbonate or potassium carbonate, is suitable for preparing the alkaline solution in which the extracted 4,4'-dihydroxy diphenyl sulfone can be dissolved and the amount of water and concentration of base material is not critical. Satisfactory decolorization results have been obtained by dissolving the extracted 4,4'-dihydroxy diphenyl sulfone in a hot alkaline solution containing about 3 parts sodium hydroxide for 10 parts of sulfone to be dissolved and adding about 0.5 to 1.0% decolorizing charcoal. Generally speaking, the amount of alkaline material used, for best results, is in excess of the stoichiometric quantity required to convert the 4,4'-dihydroxy diphenyl sulfone to its corresponding alkaline salt. In this connection, it may be pointed out that no claim is made broadly to purification techniques involving the use of alkaline solutions since this is shown, for instance, in U.S. Pat. No. 3,277,183. Neutralization of the basic material can be carried out using any acid, for instance, hydrochloric acid or sulfuric acid.

White crystalline 4,4'-dihydroxy diphenyl sulfone is readily produced in accordance with the present invention in a purity in excess of 99% and color stability exceeding that obtainable with other processes as far as is known.

The following examples are illustrative of the practice of the present invention but are in no way to be considered as limitative of its scope.

Example 1

A 100 g. sample of dark colored technical grade dihydroxy diphenyl sulfone (melting point range 212°–240° C.) was stirred in a flask at reflux with 100 ml. of isopropyl acetate for 30 minutes, cooled and filtered. The filter cake was washed with about 50 ml. of isopropyl acetate and dried to recover 72.5 g. of tan colored 4,4'-dihydroxy diphenyl sulfone. This solvent extracted product had a purity of 98% and a melting point range of 244–247° C. This is a relatively high degree of purity and the tan colored product is, without further purification, suitable for various polymerized products.

The tan colored product was then dissolved in 140 ml. of water containing 23 g. of sodium hydroxide to which was added 1 g. of decolorizing charcoal (activated carbon) and the mixture was stirred at reflux for one hour. The solution was filtered while hot to remove the charcoal, and then acidified while still hot to precipitate the 4,4'-dihydroxy diphenyl sulfone. The separated crystals were washed with water and dried to recover 64 g. of the pure (99% by gas chromatography) 4,4'-isomer.

The color improvement throughout the steps of the process is shown by the following comparative data using the Gardner color standard (ASTM D 1544–58T).

10% acetone solution: Gardner standard
Technical grade 4,4'-isomer _____ 13
Tan (solvent extracted) _____ 5
White (final product) _____ <1

A substantial amount of the isopropyl acetate used in the foregoing example can be easily recovered via distillation and re-used for another extraction.

EXAMPLE 2

The solvent extraction procedure of Example 1 was repeated using methylamyl acetate. The same ratio of solvent to sulfone was used and the extraction was carried out at the reflux temperature of the solvent, about 145° C. A yield of 78% tan colored, 98% pure 4,4'-dihydroxy diphenyl sulfone was obtained. The melting point of the product was 243–246° C.

EXAMPLE 3

Crude technical grade (melting point range 212–240° C.) 4,4'-dihydroxy diphenyl sulfone was treated according to the solvent extraction procedure of Example 1 but using solvents noted in the table below. The table summarizes results obtained with each of the extraction solvents.

| Solvent | Percent Recovery | Melting Point, product ° C. |
| --- | --- | --- |
| Ethyl acetate | 63 | 243–247 |
| n-Propyl acetate | 60 | 243–247 |
| Isobutyl acetate | 69 | 243–246 |
| Dimethyl phthalate | 68 | 244–247 |
| Diethyl maleate | 70 | 245–247 |
| Butoxyethyl acetate | 65 | 244–247 |
| Dimethyl malonate | 66 | 245–248 |
| Dimethyl carbonate | 73 | 243–247 |

The 4,4'-dihydroxy diphenyl sulfone as separated by the various ester extractions of this example analyzed to a purity of 98%. Further treatment in aqueous alkaline solution with decolorizing charcoal, as described in Example 1, in each case resulted in a highly refined, pure, white, stable product.

What is claimed is:

1. A process for the separation of 4,4'-dihydroxy diphenyl sulfone from a mixture comprising 4,4'-dihydroxy diphenyl sulfone and 2,4'-dihydroxy diphenyl sulfone which comprises contacting the mixture with an ester extraction solvent in the form of a liquid mono- and/or di-carboxylic acid ester of an alcohol in which said acid and said alcohol each contains from 1 to 8 carbon atoms to dissolve the 2,4'-dihydroxy diphenyl sulfone from said mixture, and separating said dissolved 2,4'-dihydroxy diphenyl sulfone from the undissolved 4,4'-dihydroxy diphenyl sulfone.

2. The process of claim 1, wherein said ester extraction solvent corresponds to the formula $$R(COOR')_n$$

where R may be hydrogen when $n$ is 1; and R and R' may be unsubstituted or substituted alkyl, alkylene, alkenyl or alkoxy radicals containing from 1 to 10 carbon atoms, or phenyl radicals, when $n$ is 1 or 2.

3. The process of claim 2, wherein R is methyl, and $n$ is 1.

4. The process of claim 1, wherein the solvent extraction is carried out at substantially the reflux temperature of the solvent.

5. The process of claim 1, which includes treating the extracted 4,4'-dihydroxy diphenyl sulfone with decolorizing adsorbent in an aqueous alkaline solution and recovering the purified 4,4'-dihydroxy diphenyl sulfone from the alkaline solution.

6. The process of claim 5, wherein the decolorizing adsorbent is activated carbon.

7. A process for the separation of 4,4'-dihydroxy diphenyl sulfone from a mixture comprising 4,4'-dihydroxy diphenyl sulfone and 2,4'-dihydroxy diphenyl sulfone which comprises contacting the mixture with an ester extraction solvent in the form of a normally liquid acetate ester of an alcohol in which said alcohol contains from 1 to 10 carbon atoms to dissolve the 2,4'-dihydroxy diphenyl sulfone from said mixture, and separating said dissolved 2,4'-dihydroxy diphenyl sulfone from the undissolved 4,4'-dihydroxy diphenyl sulfone.

8. The process of claim 7, wherein the alcohol is a $C_2$ to $C_6$ aliphatic monohydric alcohol.

9. The process of claim 7, wherein the extraction solvent is isopropyl acetate.

10. The process of claim 7, wherein the extraction solvent is methylamyl acetate.

11. A process for the separation of 4,4'-dihydroxy diphenyl sulfone from a mixture comprising 4,4'-dihydroxy diphenyl sulfone and 2,4'-dihydroxy diphenyl sulfone which comprises contacting the mixture with a normally liquid methyl or ethyl ester of a dicarboxylic acid, said dicarboxylic acid containing not more than 10 carbon atoms, to dissolve the 2,4'-dihydroxy diphenyl sulfone from said mixture, and separating said dissolved 2,4'-dihydroxy diphenyl sulfone from the undissolved 4,4'-dihydroxy diphenyl sulfone.

References Cited
UNITED STATES PATENTS

| | | | |
|---|---|---|---|
| 3,297,766 | 1/1967 | Bradley et al. | 260—607 |
| 3,366,692 | 1/1968 | Orem | 260—607 |

D. R. PHILLIPS, Assistant Examiner

CHARLES B. PARKER, Primary Examiner